United States Patent Office 3,756,848
Patented Sept. 4, 1973

---

3,756,848
METHOD OF MAKING HIGH TEMPERATURE POLYURETHANE PRESSURE-SENSITIVE ADHESIVE TAPE
Rolf Dahl, West Columbia, S.C., assignor to Continental Tapes, Incorporated, Columbia, S.C.
No Drawing. Application May 6, 1969, Ser. No. 822,314, now Patent No. 3,671,301, which is a continuation-in-part of application Ser. No. 762,995, Sept. 26, 1968, now Patent No. 3,515,773. Divided and this application Feb. 2, 1972, Ser. No. 222,989
Int. Cl. C09j 7/02
U.S. Cl. 117—122 P                6 Claims

ABSTRACT OF THE DISCLOSURE

Ordinary pressure-sensitive adhesives based on natural or synthetic rubber are made high temperature resistant by curing with reaction-products of polyisocyanates and hydroxylated elastomers.

---

This application is a division of my copending application, Ser. No. 822,314, filed May 6, 1969 and now U.S. Pat. No. 3,671,301 which is a continuation-in-part of application Ser. No. 762,995, filed Sept. 26, 1968 and now U.S. Pat. No. 3,515,773. I have described pressure-sensitive adhesives made by reacting a prepolymer reaction-product of polyols and polyisocyanates with hydroxylated elastomers. I have now discovered that ordinary pressure-sensitive adhesives based on natural or synthetic elastomers (rubbers) may be made high temperature resistant by reacting (curing or cross-linking) them with certain prepolymers made by reaction of polyisocyanates with such hydroxylated elastomers.

High temperature resistant pressure-sensitive adhesives have been made in the past by partially curing the natural or synthetic rubber on which they are based, by the use of sulfur or phenolic resins. These elastomers can also be cured (cross-linked) by isocyanates especially in the presence of catalysts, but simple addition of isocyanates to the adhesive mass yields a mixture which increases in viscosity so fast as to present serious problems when the mass, for example, is to be dissolved and coated upon a backing to make tape. I have found, however, that this difficulty can be avoided and at the same time greater cohesive strength achieved through use of certain prepolymers made by reacting polyisocyanates with hydroxylated elastomers. These advantages can be illustrated by adding 1% tolylene diisocyanate (hereinafter designated TDI) to one portion of a rubber-based pressure-sensitive adhesive and the same amount of unreacted isocyanate groups (hereinafter designated NCO) in the form of a prepolymer reaction-product (made as hereinafter described) of TDI and a hydroxylated polybutadiene polymer, to another portion of the same adhesive. The first mixture gels in a matter of a few hours while the second, after adding a stannous octoate catalyst and a solvent, can be coated on a backing and dried and cured in an oven even after several weeks. While the first mixture can be dissolved, catalyst added, coated on a backing, the solvent dried out and the mixture cured in an oven, if done immediately after the mix is formed, the cohesive strength of the resulting tape mass is much lower than in the case of the second mixture.

The marked improvement in high temperature resistance yielded by my methods is illustrated by the following examples which may be modified and extended within the scope of my invention by those skilled in the art. (All proportions hereinafter are by weight unless otherwise noted.)

EXAMPLE 1

(A) A normally tacky pressure-sensitive adhesive was made by compounding 250 parts crepe rubber, 150 parts polyterpene resin (Schenectady St. 5115, melting-point 115° C., made by Schenectady chemicals, Inc., Schenectady, N.Y.), 17 parts heat-reactive phenol-formaldehyde resin (Schenectady SP 1045, made by Schenectady Chemicals, Inc.), 60 parts petroleum hydrocarbon resin (Piccopale, made by Pennsylvania Industrial Chemical Corp., Clairton, Pa.), 5 parts 2,6-di-tertiary butyl para cresol antioxidant (Catalin CAO-1, made by Catalin Corporation, New York, N.Y.). The mix was dissolved in toluene to form a solution containing 30% solids, knife-coated on an impregnated (saturated) paper backing (made according to the methods of my copending application, Ser. No. 297,190) to give a dry coating-weight of 5.5 grams per sq. ft. This was dried by conveying it through an oven at 250° F. with a dwell-time of about 3 minutes.

The resulting tape was a good pressure-sensitive tape with the following properties when tested according to the methods of the Pressure Sensitive Adhesive Tape Council: Quick-Stick 19 oz. (laying on a polished steel surface without pressure and determining the force required to remove a 1-inch wide strip at 90° angle with the surface); 90° Peel Adhesion, 24 oz. (laying a 1-inch wide strip on a polished steel surface, rolling it down with a 4½ lb. rubber-covered roller and determining the force needed to remove it at 90°); 180° Peel Adhesion, 32 oz. (same as at 90° except removing it at 180°). However, the tape left a heavy residue when stripped from a polished steel plate after being heated for 30 minutes at 250° F.

(B) A prepolymer was made by reacting 100 parts hydroxylated butadiene-acrylonitrile copolymer (85% butadiene, 15% acrylonitrile, hydroxyl number 39) with 12 parts TDI at 215° F. for about 1 hour until analysis for free NCO showed that all the hydroxyl groups (hereinafter designated OH) of the copolymer had reacted. (This resulted in reaction of substantially all of the more reactive NCO (the 4-position groups of the TDI) leaving only the less reactive 2-position NCO which are hindered by their proximity to the methyl groups.) An amount of this prepolymer corresponding to ½% TDI, based on the weight of crepe rubber in the adhesive (calculating the unreacted NCO as TDI) was added to the adhesive of part A, above, together with an amount of stannous neodecanoate catalyst equal to ½ the weight of prepolymer. The resulting mix was dissolved to a 40% solution in toluene and coated and dried as in part (A), above. The resulting tape had the same room temperature properties as the product of part (A), but it left no residue when stripped hot from a polished steel plate after 30 minutes at 300° F.

EXAMPLE 2

(A) A pressure-sensitive adhesive consisting of 100 parts SBR rubber (75% butadiene, 25% styrene, Solprene 301, made by Phillips Petroleum Co., Bartlesville, Okla.), 40 parts ZnO, 60 parts pentaerythritol ester of hydrogenated rosin (Pentalyn H, made by Hercules Inc., Wilmington, Del.), 20 parts heat-reactive phenol-formaldehyde resin (Schenectady SP 1045) and 10 parts mineral oil, was mixed into 300 parts toluene and 300 parts heptane. The solution was coated, dried and tested as in Example 1A and had the same properties as the product of 1(A).

(B) A prepolymer, made as in Example 1B, but by reacting 100 parts of the hydroxylated styrene-butadiene copolymer, as described later, with 13 parts TDI was then added to the adhesive mix of part 2(A) in amount corresponding to 3% TDI based on the weight of SBR in the adhesive of part 2(A), calculating the free NCO in the prepolymer as TDI, plus an amount of stannous octoate catalyst equal to ¼ the weight of prepolymer taken. The 60% solution of this mix in toluene was coated, dried and tested as in Example 1(B). The tape left no residue on a polished steel plate when stripped hot after 17 minutes at 325° F.

EXAMPLE 3

(A) A normally tacky pressure-sensitive adhesive consisting of 200 parts synthetic rubber (polyisoprene, 97% cis-1,4 polymer, made by Goodyear Tire and Rubber Co., Akron, Ohio, designated Natsyn 245), 50 parts glycerol ester of hydrogenated rosin (Staybelite Ester 10, made by Hercules Inc., Wilmington, Del.), 50 parts polyterpene resin (Schenectady St. 5115), 50 parts petroleum hydrocarbon resin (Piccopale), 50 parts phenol-formaldehyde resin (SP 1045), 5 parts mineral oil, 2 parts antioxidant (CAO–1) and 750 parts toluene, was coated and dried as in Example 1(A) and had the same properties as the tape of Example 1(A).

(B) The prepolymer of Example 1(B) was then added to the adhesive mix of Example 3(A) in amount corresponding to 1% TDI based on the weight of polyisoprene, calculating the free NCO as TDI, plus ½ the weight of prepolymer used, of stannous octoate catalyst. The mix was dissolved to a 30% solution in toluene and coated and dried as usual. The product had the same properties as the tape of 3(A) at room temperature but, unlike it, left no residue when stripped from a polished steel plate after 30 minutes' heating at 300° F.

EXAMPLE 4

100 parts of non-curing natural rubber based tape adhesive (similar to the adhesive of Example 1(A) except without the phenol-formaldehyde resin) was mixed with 5 parts of hydroxylated acrylonitrile-butadiene prepolymer (as in Example 1(B)) and 1 part stannous octoate catalyst. The mix was dissolved to a 30% solution in toluene and coated and dried as in Example 1(A). The resulting tape stripped clean from a polished steel plate after 30 minutes' heating at 300° F.

EXAMPLE 5

100 parts of the rubber-based adhesive of Example 4 was mixed with 3 parts of the hydroxylated styrene-butadiene copolymer-isocyanate reaction-product of Example 2(B) and 1 part of stannous octoate catalyst. The mix was dissolved to a 30% solution in toluene and coated and dried as in Example 1(A). The resulting tape stripped clean from a polished steel plate after 17 minutes' heating at 320° F.

While I have shown the use of TDI in my examples and I prefer this diisocyanate because of its relative availability and cost, I may use other polyisocyanates, preferably those having NCO of differing reactivity as in TDI. Some of these are cited in the book entitled "Polyurethanes" by B. A. Dombrow, published by Reinhold Publishing Corp., New York, N.Y. (1957) and certain of the isomeric diisocyanates of ethyl benzene, xylene, bitolylene, methyl diphenyl methane, dimethyl diphenyl methane, dianisidine and chlorine-hindered aromatic polyisocyanates which I designate as partially sterically-hindered aromatic polyisocyanates.

In other experiments I have found that the NCO-terminated prepolymer may also be made using a hydroxylated polyisoprene elastomer reacted with TDI in a way similar to that used in my examples. In general the well-known types of normally tacky pressure-sensitive adhesives may be made high temperature resistant as shown in the examples, whether based on natural or synthetic elastomers, by combination with NCO-terminated prepolymers of hydroxylated, liquid polybutadiene, polybutadiene-styrene, polybutadiene-acrylonitrile or polyisoprene. Also I may make a normally tacky pressure-sensitive adhesive by substituting polybutadiene-acrylonitrile for the SBR of Example 2(A).

The molecular ratio of NCO:OH in reacting TDI with hydroxylated elastomers can vary from about 1.1 to 2. The prepolymer is normally used in from 2 to 10 parts per 100 parts of the normally tacky pressure-sensitive adhesive as in the A parts of the examples. The polyurethane catalyst may be stannous octoate or neodecanoate or the stannous salt of any aliphatic carboxylic acid with from 1 to 20 carbon atoms. I may also use tertiary amine catalysts, lead naphthenate or the catalysts of U.S. 3,392,128 or 3,397,158 such as dibutyl tin laurate and other stannic salts or mixtures of catalysts. But stannous octoate and neodecanoate are very active and when less active catalysts are used my high temperature resistant tape may have to age a week at room temperature before the properties described are fully developed. Curing times and temperatures are usually as shown hereinbefore but I may use final heating up to 350° F. for a few seconds to effect quick final cure. Catalysts are used in amounts from 25 to 100% of the weight of the prepolymer. The prepolymer may be used in amounts from about ¼ to 3% of the TDI equivalent of the unreacted NCO left in the prepolymer after its formation, based on the weight of elastomer (rubber) in the adhesive to which the prepolymer is added. In making the prepolymer, any temperature from about 215° F. down to room temperature may be used as long as analysis shows all OH groups of the hydroxylated elastomer, and preferably all of the more reactive NCO are reacted. At room temperature, the prepolymer reaction takes overnight.

The hydroxylated elastomers I use are all liquids described as follows (1) styrene-butadiene copolymer, 15 to 20% styrene (preferably 20%), hydroxyl number 42, 60% trans, 20% cis (1–4), 20% vinyl (1–2), viscosity 295 poises at 30° C., 7.6 lbs. per gallon, iodine number 335 (2) acrylonitrile-butadiene copolymer, 10 to 20% acrylonitrile (preferably 15%), hydroxyl number 39, 60% trans, 20% cis (1–4), 20% vinyl (1–2), viscosity 500 poises at 30° C., 7.7 lbs. per gallon, iodine No. 345 (3) polybutadiene, hydroxyl number 45, viscosity 200 poises at 30° C., 7.5 lbs. per gallon, iodine number 355, 60% trans, 20% cis (1–4), 20% vinyl (1–4). The hydroxyl numbers may vary from 20 to 60, although I prefer the hydroxyl numbers shown in the examples for the respective elastomers. The proportions of trans, cis and vinyl may vary from 57 to 63, 19 to 21 and 19 to 21 respectively. The viscosities may vary plus or minus 5% and the iodine numbers similarly plus or minus 5%.

The TDI used in my examples was a commercial product was 80% 2,4 and 20% 2,6 isomers and I generally treat it in my calculations as if it were all the 2,4 isomer. The tape backing used in my examples is an impregnated (saturated) paper but other types of backings can be used and, if impregnated, can be made using butyl or other synthetic rubber as in general use. Coating weights usually run 4 to 7 g./sq. ft.

Other well-known antioxidants can be used such as phenyl-alpha-naphthalamine or the condensation product of butyraldehyde and aniline, but the one used in my examples is cheap and non-staining. I prefer to use tackifying resins of low active hydrogen content and plasticizers of low acid number, but reaction of free NCO in the prepolymer is so rapid in reacting with the active hydrogen in the rubber (elastomer) that this is not imperative.

Although I prefer to use a polyisocyanate with NCO groups of differing reactivity as enumerated, I may still use aromatic polyisocyanates in which the NCO groups are of essentially equal reactivity, including 2,6 and 3,5 TDI. The polisocyanates I use, irrespective of whether their NCO groups are of equal or differing reactivity, I designate merely as aromatic polyisocyanates. When I use a polyisocyanate which I have described as a partially sterically-hindered polyisocyanate (which means a polyisocyanate containing NCO groups of differing reactivity)

or merely as aromatic polyisocyanates, I still calculate the proportion of prepolymer to rubber of the adhesive in terms of the TDI equivalent of the unreacted NCO.

My adhesive mass containing prepolymer may be dissolved for coating purposes in any inert solvent of volatility similar to that of toluene or heptane.

Having thus described my invention, what I claim is:

1. The method of making a high temperature resistant pressure-sensitive tape which comprises (1) adding to a normally tacky pressure-sensitive adhesive mass based on a rubber selected from the class consisting of natural rubber, butadiene-styrene rubber, butadiene-acrylonitrile rubber and polyisoprene rubber, a prepolymer made by reacting at least one of the hydroxylated synthetic elastomers selected from the class consisting of polybutadiene-styrene, polybutadiene-acrylonitrile, polybutadiene and polyisoprene with at least one aromatic polyisocyanate in the proportion of NCO:OH of 1.1:1 to 2:1, in amount of prepolymer from ¼ to 3% by weight based on the weight of rubber in said adhesive mass, of the toluene diisocyanate equivalent of the free isocyanate groups in said prepolymer; (2) dissolving the product of part (1) in a volatile, inert solvent to make a solution of solids content between 30 and 60% by weight; (3) adding to the product of part (2) at least one catalyst in amount from about 25% to 100% of the weight of said prepolymer, selected from the class consisting of stannous and stannic salts of aliphatic carboxylic acids of from 1 to 20 carbon atoms per molecule, dibutyl dilaurate, tertiary amines and lead naphthenate; (4) coating the product of part (3) on a flexible backing material; and (5) heating the product of part (4) to a temperature and for a time sufficient to remove the said solvent and substantially completely react the isocyanate groups in said prepolymer.

2. The method of claim 1 wherein the said catalyst selected in part (3) is stannous octoate.

3. The method of claim 1 wherein the said catalyst selected in part (3) is stannous neodecanoate.

4. The method of claim 1 wherein the said aromatic polyisocyanate is tolylene diisocyanate containing a major proportion of the 2,4 isomer and the said unreacted isocyanate groups are essentially those in the 2-position of said tolylene diisocyanate.

5. The method of claim 1 wherein the said aromatic polyisocyanate is a partially sterically-hindered aromatic polyisocyanate.

6. The method of claim 5 wherein the said free isocyanate groups of the said prepolymer are the less reactive isocyanate groups of said partially sterically-hindered aromatic polyisocyanate.

References Cited
UNITED STATES PATENTS

| | | | |
|---|---|---|---|
| 3,246,049 | 4/1966 | Webber | 117—122 X |
| 3,427,366 | 2/1969 | Verdol | 260—859 |
| 3,085,903 | 4/1963 | Bemmels et al. | 117—122 X |

WILLIAM D. MARTIN, Primary Examiner

B. D. PIANALTO, Assistant Examiner

U.S. Cl. X.R.

117—122 PB, 161 KP, 161 A, 161 UT; 260—77.5 CR, 858, 859 R